(No Model.) 2 Sheets—Sheet 1.
M. CARTMELL & N. BAYLESS.
WAGON BRAKE.
No. 324,081. Patented Aug. 11, 1885.
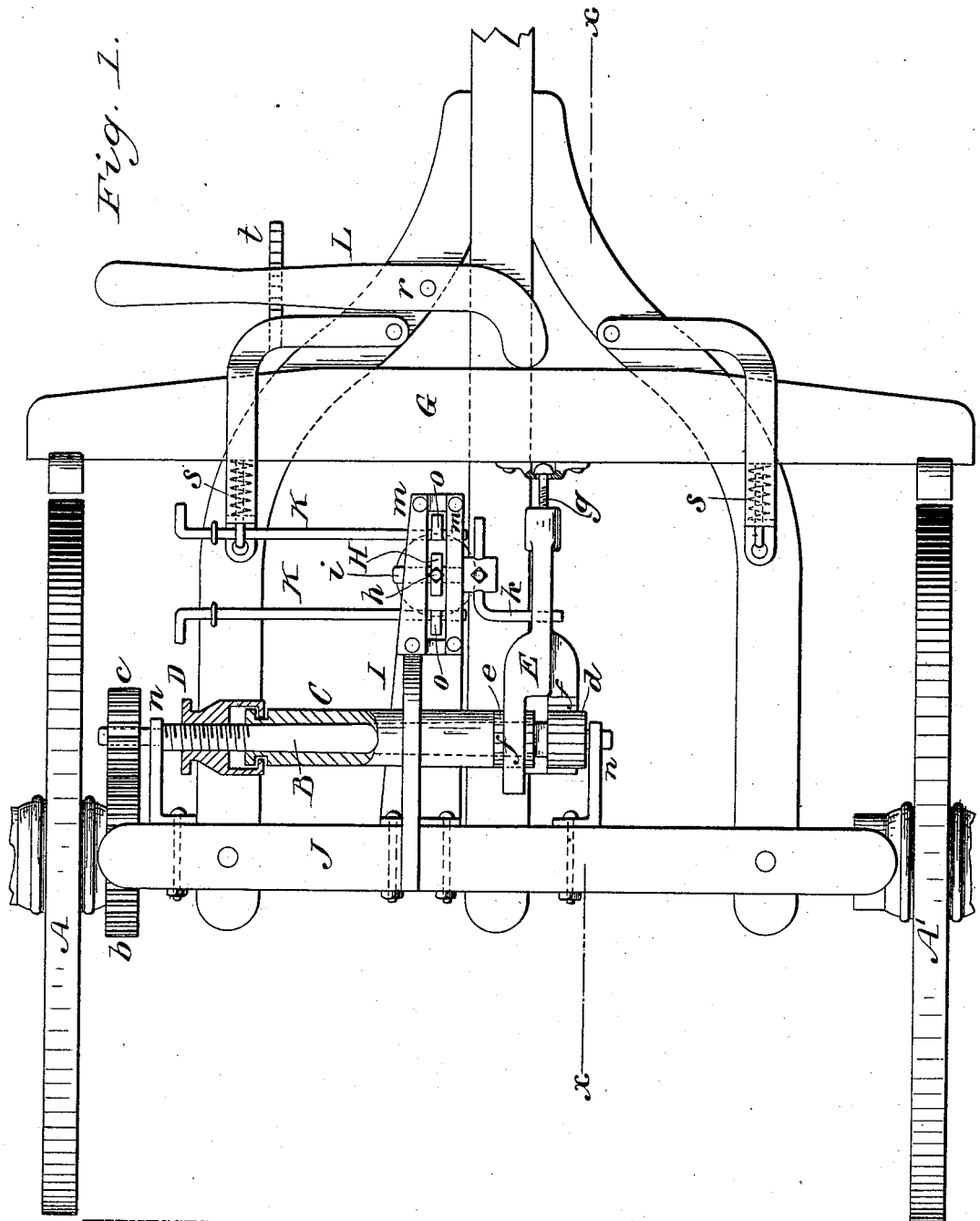
WITNESSES:
INVENTOR:
M. Cartmell
N. Bayless
BY Munn & Co.
ATTORNEYS.

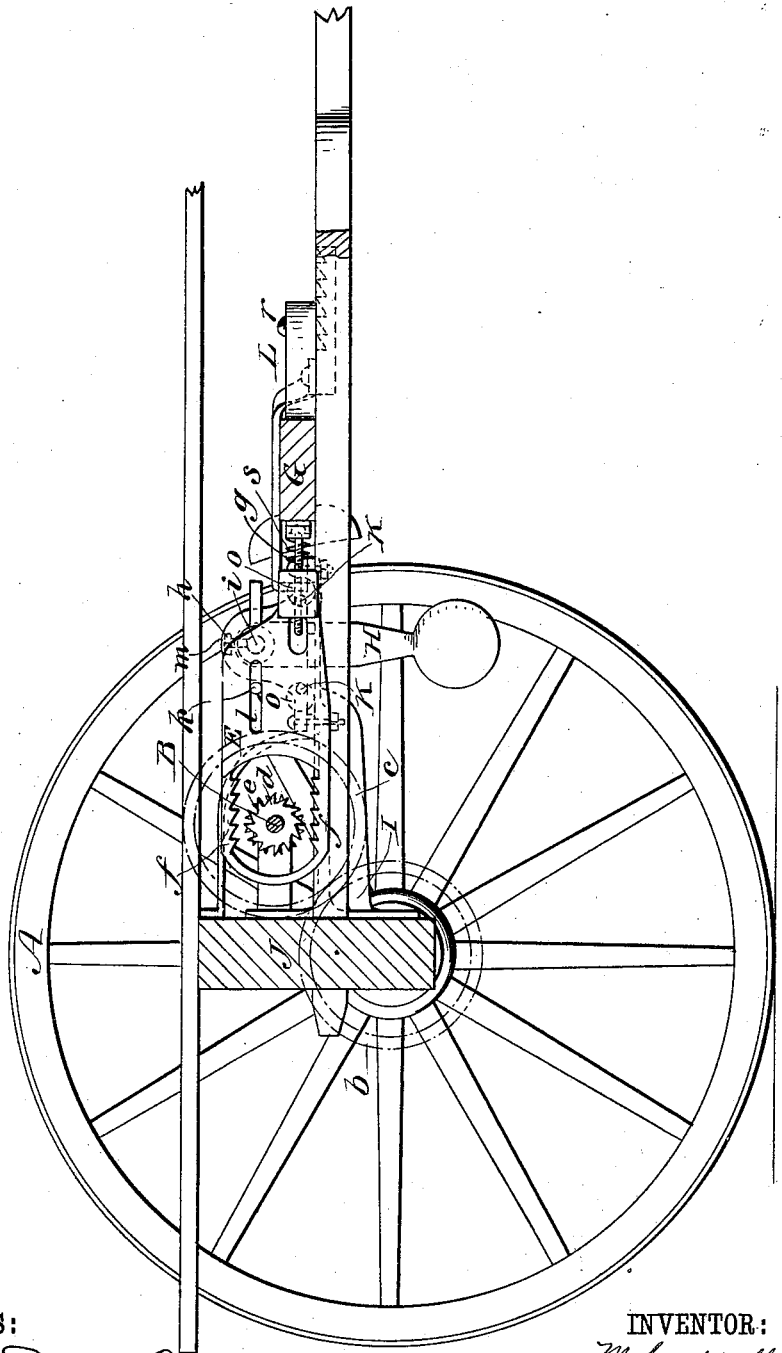

UNITED STATES PATENT OFFICE.

MINOR CARTMELL AND NELSON BAYLESS, OF URBANA, OHIO.

WAGON-BRAKE.

SPECIFICATION forming part of Letters Patent No. 324,081, dated August 11, 1885.

Application filed April 17, 1885. (No model.)

*To all whom it may concern:*

Be it known that we, MINOR CARTMELL and NELSON BAYLESS, both of Urbana, in the county of Champaign and State of Ohio, have invented a new Improvement in Wagon-Brakes, of which the following is a full, clear, and exact description.

This invention consists in an automatic brake of novel construction, substantially as hereinafter described, suitable for farm, road, transportation, or express, thrasher, and other wagons, drays, or vehicles, whereby the brake, which may also be controlled by hand when desired, is made perfectly automatic, both on upgrades and downgrades, in a very simple and effective manner.

Reference is to be had to the accompanying drawings, forming part of this specification, in which similar letters of reference indicate corresponding parts in both the figures.

Figure 1 represents a plan view of the rear running-gear and portion of a wagon having our automatic brake with its mechanism applied, and Fig. 2 a vertical section of the same on the line $x\ x$ in Fig. 1.

A A' indicate the two hind wheels of a wagon. Attached to the hub of, say, the left-hand one, A, of these wheels is a gear-wheel, $b$, which engages in front of it with a wheel, $c$, fast on a tapering shaft, B. Said shaft carries a barrel, C, of corresponding taper on its interior, so as to snugly fit the shaft.

Fast on the opposite end of the shaft B to that carrying the gear-wheel $c$ is a ratchet-wheel, $d$, and on the corresponding end of the barrel C is another ratchet-wheel, $e$. These ratchet-wheels are set with their teeth running in reverse directions to one another, or, in other words, are reverse ratchet-wheels.

D is a tension-regulating nut arranged to fit a screw-thread on the gear-wheel end of the shaft B, and to engage as a clip with the barrel C, for the purpose of regulating the friction hold or tension of the barrel on the shaft to adjust the draft on the brake as required.

E is a slotted or jaw-shaped draw-bar having reversely-arranged ratchet-teeth on its upper and lower jaws, $f\ f$, for engagement, respectively, with the ratchet-wheels $d\ e$ on opposite sides of the axis of the shaft B and barrel C.

G is the brake-beam, which is connected with the draw-bar E by an adjustable coupling-pin, $g$. The connection should be sufficiently free to admit of the draw-bar slightly rising and falling.

When the wagon is on a level, the teeth on the upper and lower jaws of the draw-bar E do not engage with either of the ratchet-wheels $d\ e$, as shown in Fig. 2, and the draw-bar is held in such position by a short ball or weighted pendulum, H. The upper end of the rod of said pendulum is made adjustable, as by a set-screw, $h$, on a short shaft, $i$. This shaft carries a crank, $k$, radially adjustable in relation with said shaft by fitting it to slide transversely through a head on the outer end thereof, subject to retention when adjusted by a set-screw applied to said head and arranged to engage by a slot, $l$, with the draw-bar. The shaft $i$ is carried by boxes $m$ on a bracket, I, firmly bolted to the front side of the rear axle and bolster J, and the shaft B is similarly supported by boxes or bearings $n$, secured on the front side of said axle and bolster.

K K are spindle cut-offs, capable of being axially rotated in the boxes $m$ by means of handles or crooks on their outer ends, said cut-offs, which are arranged one in front and the other in rear of the pendulum H, being provided with toes $o\ o$, that serve accordingly as said cut-offs are turned to stop the back or forward action of the brake, or both, at the discretion of the driver, whenever such stoppage may be necessary—as, for instance, when traveling over muddy roads.

L is a hand-lever for locking the wagon when on a level, should the driver desire to leave his team unhitched or untied. This lever, which is pivoted as at $r$, is constructed when drawn out to force up the brake-beam against the wheels as against the pressure of the brake-releasing springs $s\ s$, and catches when so drawn out in a ratchet-holder, $t$, to hold the brake firm.

When the wagon is traveling forward, the spindle or shaft B has a backward rotation, and when the wagon strikes a downgrade of sufficient declivity the pendulum H swings forward and the crank $k$ drops the draw-bar E into engagement with the ratchet $e$ on the barrel C, which draws the brake-beam G, with its attached shoes, onto the wheels A A'. When the wagon passes onto a level, the pendulum H swings back to an extent that, by the aid of the crank k, disengages the upper jaw f of the draw-bar from the ratchet e on the barrel, but not sufficiently to engage the lower jaw f of said bar with the ratchet d on the shaft B, as shown in Fig. 2. The spring or springs s, which may be of any suitable description, then act upon the brake-beam G to remove its shoes from contact with the wagon-wheels A A'. On the other hand, when the wagon strikes an upgrade of sufficient acclivity, the pendulum H swings back far enough to cause the crank k to raise the draw-bar E, so that the teeth on its lower jaw f mesh with the ratchet d on the shaft B; but, owing to the direction in motion of said ratchet and the arrangement of its teeth, the ratchet will slip over the teeth on said jaw and fail to operate the draw-bar and brake-beam until the wagon stops and makes a slight backward movement, when the shaft B, revolving forward, draws the brake to a dead-lock by the action of the ratchet d on the draw-bar. As the wagon is moved forward again, however, the brake-beam, with its shoes, is released by the action of its spring or springs from the wheels A A' of the wagon.

It will be observed that there is a space left between the ratchet-wheels d e, and that the jaws f f, which are narrower than said ratchets, are not directly over one another. This admits of regulating the tension of the brake by screwing or unscrewing the nut D.

The combination and arrangement of parts as described admit of the wagon being backed when on an upgrade or traveling on a level by suitably turning or adjusting the spindle cut-offs K, with their toes o o, so that the pendulum H will be restrained from swinging to throw the brake into action, and by turning or adjusting the rear cut-off K so that its toe o will have a reverse action or hold on the pendulum the wagon can be backed on a downgrade.

When it is not desired to have the brake operate in traveling over light grades, the adjustable crank k may be shortened, or the pendulum H, by means of the set-screw h, be adjusted on its shaft to slightly raise the crank, or both adjustments be made.

The adjustability of the coupling-pin g provides for adapting the brake to different-sized wagon-wheels.

By connecting the draw-bar, as represented, to the brake-beam on one or right-hand side of the center line of the draft the pressure of the brake on the two wheels of the wagon is equalized. If arranged in the center line of the draft, the wagon-wheel which actuates the brake through the shaft B would be arrested in advance of the other wheel. A cap or covering may be placed over the gear-wheels b c to protect them from mud and dirt.

A wagon-brake constructed as described accomplishes all the work required of such a device, and in its control of back action is of much value on long upgrades when applied to heavily-loaded wagons, as the driver can stop and rest his team as often as necessary with no inconvenience. Again, the whole of the brake being carried by the running-gear, its working is not interfered with by the removal of the wagon-box, nor by the wagon being loaded with hay, straw, fodder, and other like material, which often makes the ordinary hand-lever brake useless. No kind of load, in fact, will interfere with the working of the brake at all times when needed, and by its adjustability it can be purely automatic, and as no levers require to be controlled by the driver, when the brake is properly adjusted to act automatically the driver can give undivided attention to his team. All objectionable complication is avoided, so that, apart from its great convenience, the brake has the advantage of simplicity, strength, and durability, and need not cost much, if any, more than a good hand-lever brake, and by means of the lever L it may be used as a hand-brake when desired, or for locking the wagon when on a level.

Having thus described our invention, what we claim as new, and desire to secure by Letters Patent, is—

1. The combination, with the running-wheels of the vehicle to which the brake is to be applied, of a shaft geared to rotate in a reverse direction to said wheels, a barrel on said shaft for operation by friction therewith, reverse ratchets arranged, respectively, on said shaft and on the barrel, a rising and falling draw-bar provided with an upper and lower series of reverse ratchet-teeth arranged to engage with either of said ratchets and to be disengaged from both of them, a brake-beam connected with said bar, a weighted pendulum with attached crank for controlling the draw-bar to actuate the brake-beam, and a spring or springs for releasing said beam from the wheels of the vehicle, substantially as specified.

2. In an automatic brake for wagons and other vehicles, the combination, with the tapering brake-actuating shaft B and the internally correspondingly-tapered barrel C, of the nut D, arranged to fit a screw-thread on said shaft and to engage with said barrel for regulating the tension of the brake, substantially as described.

3. The combination, with the vehicle-wheels A A', of the gears b c, arranged for actuation by the one wheel, the tapering shaft B, the tension or friction barrel C, the reverse ratchets d e, the double-jawed rising and falling draw-bar E, having reverse ratchet-teeth for engagement with and disengagement from said ratchets, the weighted pendulum H, with attached crank, arranged to raise and lower the draw-bar, and the brake-beam G, substantially as specified.

4. In combination with the rising and falling toothed draw-bar E of the brake and its controlling weighted pendulum H, the crank $k$, connecting said pendulum and draw-bar, adjustable in relation with the pendulum to vary its control of the draw-bar, essentially as and for the purpose herein set forth.

5. The cut-off spindles K K, having attached toes $o$ $o$, in combination with the weighted pendulum H, by which the engagement and disengagement of the draw-bar of the brake with its actuating devices is controlled, substantially as specified.

6. In an automatic brake having combined with it a weighted pendulum for controlling its action, the pendulum H, and its shaft $i$, on or around which it is made adjustable, in combination with the crank $k$, and the swinging draw-bar E, substantially as described.

MINOR CARTMELL.
NELSON BAYLESS.

Witnesses:
GEORGE W. MACCRACKEN,
F. F. STONE.